(12) United States Patent
Meyvaert

(10) Patent No.: US 11,581,806 B2
(45) Date of Patent: Feb. 14, 2023

(54) CIRCUITS FOR SWITCHED CAPACITOR VOLTAGE CONVERTERS

(71) Applicant: Lion Semiconductor Inc., San Francisco, CA (US)

(72) Inventor: Hans Meyvaert, Leuven (BE)

(73) Assignee: Lion Semiconductor Inc., San Francisco, CA (US)

( * ) Notice: Subject to any disclaimer, the term of this patent is extended or adjusted under 35 U.S.C. 154(b) by 77 days.

(21) Appl. No.: 17/213,268

(22) Filed: Mar. 26, 2021

(65) Prior Publication Data

US 2021/0305895 A1 Sep. 30, 2021

Related U.S. Application Data

(60) Provisional application No. 63/001,154, filed on Mar. 27, 2020.

(51) Int. Cl.
*H02M 3/07* (2006.01)
*H02M 3/00* (2006.01)

(52) U.S. Cl.
CPC ............. *H02M 3/07* (2013.01); *H02M 3/003* (2021.05)

(58) Field of Classification Search
CPC ...... H02M 3/07; H02M 3/003; H02M 1/0043; H02M 3/072
See application file for complete search history.

(56) References Cited

U.S. PATENT DOCUMENTS

| 9,350,234 B2 * | 5/2016 | Verma ..................... H02M 3/07 |
| 2008/0031023 A1 | 2/2008 | Kitagawa et al. |
| 2009/0231176 A1 | 9/2009 | Chen et al. |
| 2014/0071721 A1 * | 3/2014 | Verma ..................... H02M 3/07 363/59 |
| 2017/0300078 A1 | 10/2017 | Puggelli et al. |
| 2018/0083531 A1 | 3/2018 | Nguyen et al. |
| 2018/0123452 A1 | 5/2018 | Meyvaert et al. |
| 2019/0097609 A1 * | 3/2019 | Quiquempoix ...... H03H 19/004 |
| 2019/0252974 A1 | 8/2019 | Meyvaert et al. |

OTHER PUBLICATIONS

International Search Report and Written Opinion dated Jul. 22, 2021 in International Patent Application No. PCT/US2021/024263, pp. 1-21.

* cited by examiner

*Primary Examiner* — Adolf D Berhane
*Assistant Examiner* — Afework S Demisse
(74) *Attorney, Agent, or Firm* — Byrne Poh LLP

(57) ABSTRACT

A circuit comprising: a first switch having: first side (FS) connected to first capacitor's second side (1C2S); and second side (SS) connected to reference node (RN); a second switch having: FS connected to second voltage node (2VN); and SS connected to 1C2S; a third switch having: FS connected to the first capacitor's first side (1C1S); and SS connected to 2VN; a fourth switch having: FS connected to a third voltage node (3VN); and SS connected to 1C1S; a fifth switch having: FS connected to second capacitor's second side (2C2S); and SS connected to RN; a sixth switch having: FS connected to 3VN; and SS connected to 2C2S; a seventh switch having: FS connected to the second capacitor's first side (2C1S); and SS connected to 3VN; and an eighth switch having: FS connected to first voltage node; and SS connected to 2C1S.

8 Claims, 3 Drawing Sheets

CIRCUITS FOR SWITCHED CAPACITOR VOLTAGE CONVERTERS

CROSS-REFERENCE TO RELATED APPLICATION

This application claims the benefit of U.S. Provisional Patent Application No. 63/001,154, filed Mar. 27, 2020, which is hereby incorporated by reference herein in its entirety.

BACKGROUND

Switched capacitor voltage converters are convenient circuits for converting one DC voltage level to another. For example, in some embodiments, such voltage converters can be used to charge batteries in mobiles devices. As such, there is a very large need for switched capacitor voltage converters.

Accordingly, new and improved switched capacitor voltage converters are desirable.

SUMMARY

In accordance with some embodiments, circuits for switched capacitor voltage converters are provided.

In some embodiments, circuits for a switched capacitor voltage converter are provided, the circuits comprising: a first sub-circuit comprising: a first capacitor having a first side and a second side; a fourth capacitor having a first side and a second side; a first switch having a first side connected to the second side of the first capacitor and having a second side connected to a reference node; a second switch having a first side connected to a second voltage node and having a second side connected to the second side of the first capacitor; a third switch having a first side connected to the first side of the first capacitor and having a second side connected to the second voltage node; a fourth switch having a first side connected to a third voltage node and having a second side connected to the first side of the first capacitor; a fifth switch having a first side connected to the second side of the fourth capacitor and having a second side connected to the reference node; a sixth switch having a first side connected to the third voltage node and having a second side connected to the second side of the fourth capacitor; a seventh switch having a first side connected to the first side of the fourth capacitor and having a second side connected to the third voltage node; and an eighth switch having a first side connected to a first voltage node and having a second side connected to the first side of the fourth capacitor; and a second sub-circuit comprising: a second capacitor having a first side and a second side; a third capacitor having a first side and a second side; a first switch having a first side connected to the second side of the second capacitor and having a second side connected to the reference node; a second switch having a first side connected to the second voltage node and having a second side connected to the second side of the second capacitor; a third switch having a first side connected to the first side of the second capacitor and having a second side connected to the second voltage node; a fourth switch having a first side connected to the third voltage node and having a second side connected to the first side of the second capacitor; a fifth switch having a first side connected to the second side of the third capacitor and having a second side connected to the reference node; a sixth switch having a first side connected to the third voltage node and having a second side connected to the second side of the third capacitor; a seventh switch having a first side connected to the first side of the third capacitor and having a second side connected to the third voltage node; and an eighth switch having a first side connected to a first voltage node and having a second side connected to the first side of the third capacitor.

In some of these embodiments, the reference node is connected to ground.

In some of these embodiments, during a first configuration: the first switch of the first sub-circuit is closed; the second switch of the first sub-circuit is open; the third switch of the first sub-circuit is closed; the fourth switch of the first sub-circuit is open; the fifth switch of the first sub-circuit is open; the sixth switch of the first sub-circuit is closed; the seventh switch of the first sub-circuit is open; the eight switch of the first sub-circuit is closed; the first switch of the second sub-circuit is open; the second switch of the second sub-circuit is closed; the third switch of the second sub-circuit is open; the fourth switch of the second sub-circuit is closed; the fifth switch of the second sub-circuit is closed; the sixth switch of the second sub-circuit is open; the seventh switch of the second sub-circuit is closed; and the eighth switch of the second sub-circuit is open.

In some of these embodiments, during a second configuration: the first switch of the first sub-circuit is open; the second switch of the first sub-circuit is closed; the third switch of the first sub-circuit is open; the fourth switch of the first sub-circuit is closed; the fifth switch of the first sub-circuit is closed; the sixth switch of the first sub-circuit is open; the seventh switch of the first sub-circuit is closed; the eighth switch of the first sub-circuit is open; the first switch of the second sub-circuit is closed; the second switch of the second sub-circuit is open; the third switch of the second sub-circuit is closed; the fourth switch of the second sub-circuit is open; the fifth switch of the second sub-circuit is open; the sixth switch of the second sub-circuit is closed; the seventh switch of the second sub-circuit is open; and the eighth switch of the second sub-circuit is closed.

In some of these embodiments, the first switch of the first sub-circuit, the second switch of the first sub-circuit, the third switch of the first sub-circuit, the fourth switch of the first sub-circuit, the fifth switch of the first sub-circuit, the sixth switch of the first sub-circuit, the seventh switch of the first sub-circuit, the eighth switch of the first sub-circuit, the first switch of the second sub-circuit, the second switch of the second sub-circuit, the third switch of the second sub-circuit, the fourth switch of the second sub-circuit, the fifth switch of the second sub-circuit, the sixth switch of the second sub-circuit, the seventh switch of the second sub-circuit, and the eighth switch of the second sub-circuit are formed from MOSFETs.

In some of these embodiments, the first voltage node receives an input voltage and the second voltage node outputs an output voltage.

In some of these embodiments, the second voltage node receives an input voltage and the first voltage node outputs an output voltage.

In some of these embodiments, the circuit is used to form a multi-phase voltage converter.

DETAILED DESCRIPTION

Figure 1:
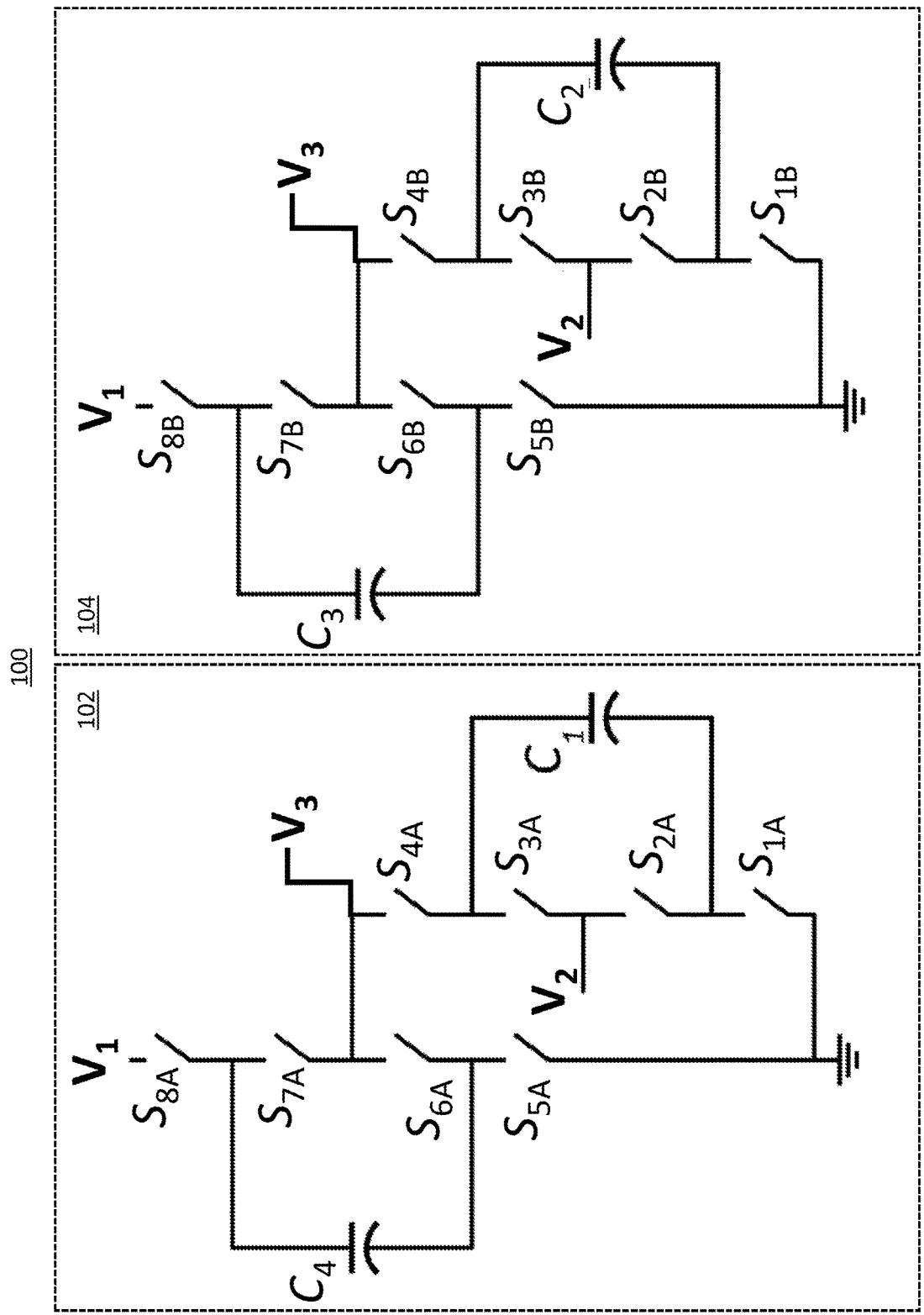
FIG. 1 shows an example schematic of a circuit for a switched capacitor voltage converter in accordance with some embodiments.

Turning to FIG. 1, an example 100 of a circuit for a switched capacitor voltage converter in accordance with some embodiments is shown. As illustrated, circuit 100 includes two sub-circuits 102 and 104. Nodes $V_1$ in sub-circuits 102 and 104 are connected together, nodes $V_2$ in sub-circuits 102 and 104 are connected together, and Nodes $V_3$ in sub-circuits 102 and 104 are connected together.

In some embodiments, $V_1$ is an input node that is connected to a voltage source, $V_2$ is an output node that is connected to a load, and circuit 100 provides an output voltage at $V_2$ that is one quarter of the input voltage at $V_1$. In other embodiments, $V_2$ is an input node that is connected to a voltage source, $V_1$ is an output node that is connected to a load, and circuit 100 provides an output voltage at $V_1$ that is four times the input voltage at $V_2$.

Circuit 100 includes four capacitors, $C_1$, $C_2$, $C_3$, and $C_4$, and sixteen switches, $S_{1A}$, $S_{2A}$, $S_{3A}$, $S_{4A}$, $S_{5A}$, $S_{6A}$, $S_{7A}$, $S_{8A}$, $S_{1B}$, $S_{2B}$, $S_{3B}$, $S_{4B}$, $S_{5B}$, $S_{6B}$, $S_{7B}$, and $S_{8B}$.

Any suitable capacitors can be used for capacitors $C_1$, $C_2$, $C_3$, and $C_4$ in some embodiments. For example, in some embodiments, the capacitors can be formed on chip or can be discrete components.

Capacitors $C_1$, $C_2$, $C_3$, and $C_4$ can have any suitable values in some embodiments. For example, in some embodiments, the capacitors can have values between 1 nF and 1 mF.

Any suitable switches can be used for switches $S_{1A}$, $S_{2A}$, $S_{3A}$, $S_{4A}$, $S_{5A}$, $S_{6A}$, $S_{7A}$, $S_{8A}$, $S_{1B}$, $S_{2B}$, $S_{3B}$, $S_{4B}$, $S_{5B}$, $S_{6B}$, $S_{7B}$, and $S_{8B}$. For example, in some embodiments, the switches can be formed from MOSFETs that are driven by any suitable drivers under the control of any suitable circuit.

Figure 2:
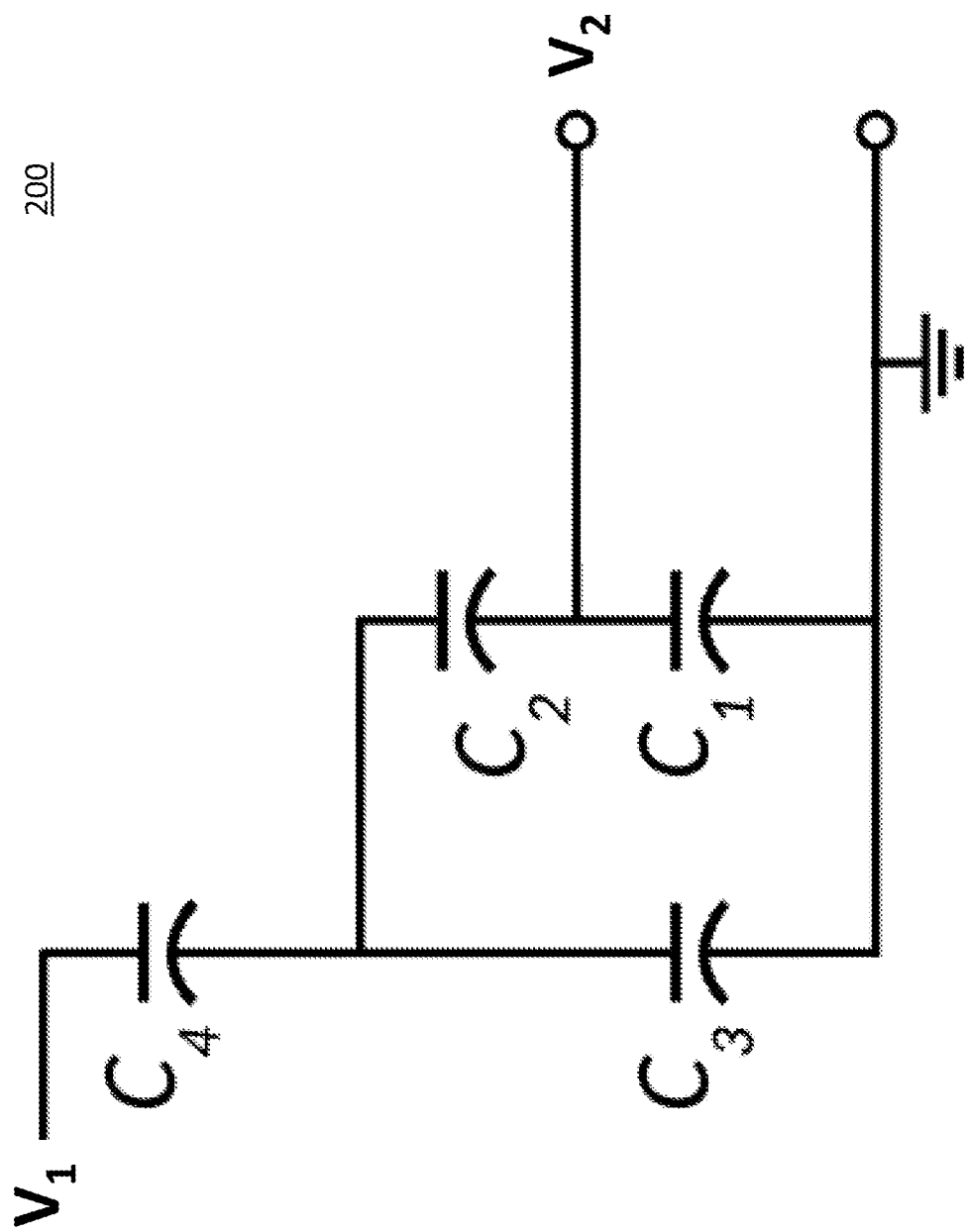
FIG. 2 shows an example schematic of the circuit for a switched capacitor voltage converter of FIG. 1 in a first configuration in accordance with some embodiments.
Figure 3:
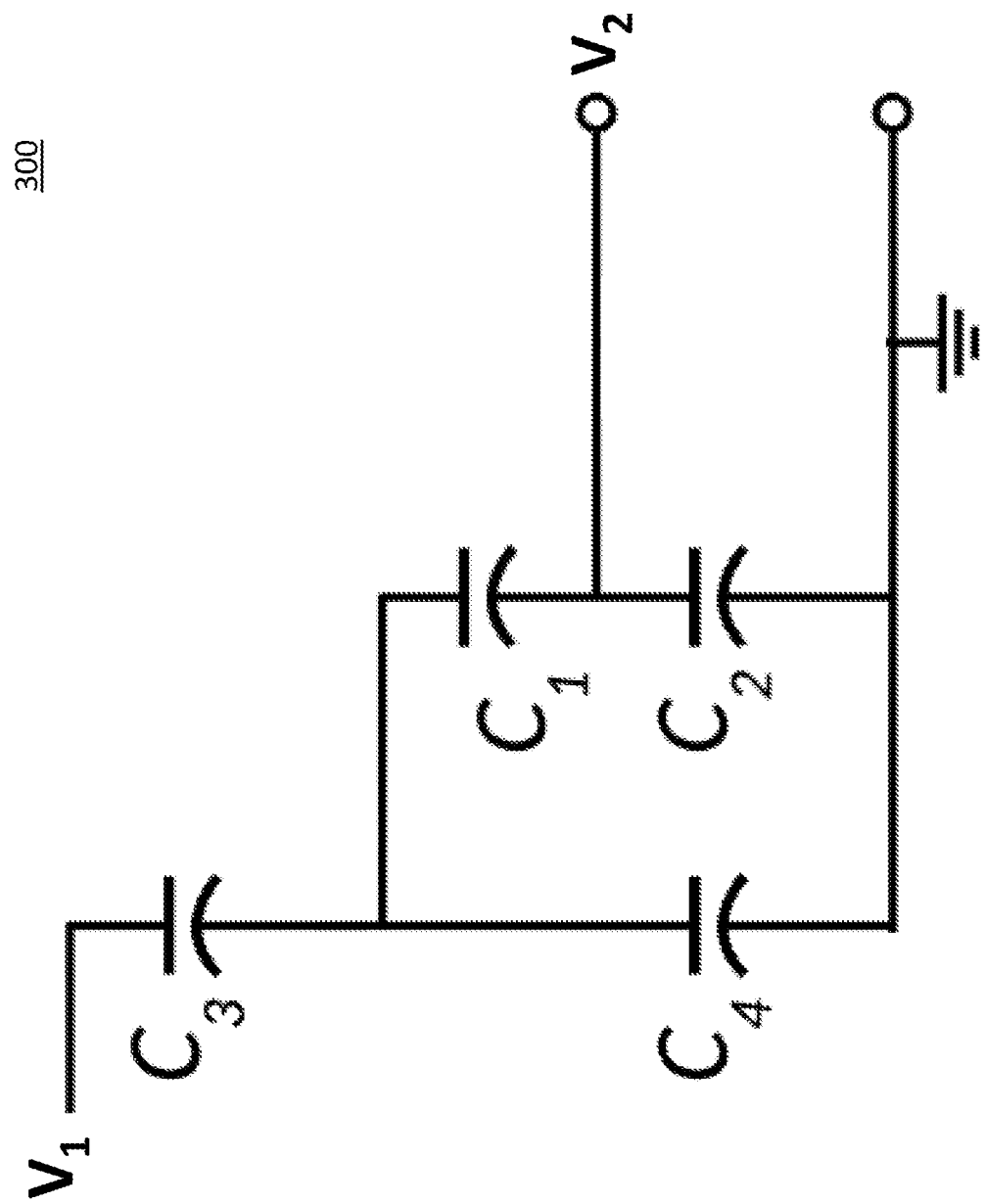
FIG. 3 shows an example schematic of the circuit for a switched capacitor voltage converter of FIG. 1 in a second configuration in accordance with some embodiments.

During operation, the switches of circuit 100 can be opened and closed to switch between circuit configurations 200 and 300 shown in FIGS. 2 and 3, respectively.

During operation, circuit 100 can switch between these two configurations at any suitable frequency. For example, in some embodiments, the circuit can switch between these two configurations at frequencies between 1 kHz (e.g., for 1 mF capacitor sizes) and 1 GHz (e.g., for 1 nF capacitor sizes).

The following table shows the settings of switches $S_{1A}$, $S_{2A}$, $S_{3A}$, $S_{4A}$, $S_{5A}$, $S_{6A}$, $S_{7A}$, $S_{8A}$, $S_{1B}$, $S_{2B}$, $S_{3B}$, $S_{4B}$, $S_{5B}$, $S_{6B}$, $S_{7B}$, and $S_{8B}$ when in configurations 200 and 300:

| Switch | Configuration 200 | Configuration 300 |
| --- | --- | --- |
| $S_{1A}$ | Closed | Open |
| $S_{2A}$ | Open | Closed |
| $S_{3A}$ | Closed | Open |
| $S_{4A}$ | Open | Closed |
| $S_{5A}$ | Open | Closed |
| $S_{6A}$ | Closed | Open |
| $S_{7A}$ | Open | Closed |
| $S_{8A}$ | Closed | Open |
| $S_{1B}$ | Open | Closed |
| $S_{2B}$ | Closed | Open |
| $S_{3B}$ | Open | Closed |
| $S_{4B}$ | Closed | Open |
| $S_{5B}$ | Closed | Open |
| $S_{6B}$ | Open | Closed |
| $S_{7B}$ | Closed | Open |
| $S_{8B}$ | Open | Closed |

In some embodiments, circuit 100 can be used to form a multi-phase voltage converter. In such an implementation, multiple copies of circuit 100 can be provided and their input and output nodes connected together (i.e., the $V_1$ connections of all of the circuits 100 are connected together and the $V_2$ connections all of the circuits 100 are connected together). In some embodiments, the switches of different circuits can be switched out of phase so that different circuits 100 switch from one configuration to another at different times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a switched capacitor voltage converter, comprising:
    a first sub-circuit comprising:
        a first capacitor having a first side and a second side;
        a fourth capacitor having a first side and a second side;
        a first switch having a first side directly connected to the second side of the first capacitor and having a second side connected to a reference node;
        a second switch having a first side connected to a second voltage node and having a second side connected to the second side of the first capacitor;
        a third switch having a first side connected to the first side of the first capacitor and having a second side connected to the second voltage node;
        a fourth switch having a first side connected to a third voltage node and having a second side directly connected to the first side of the first capacitor;
        a fifth switch having a first side directly connected to the second side of the fourth capacitor and having a second side connected to the reference node;
        a sixth switch having a first side connected to the third voltage node and having a second side connected to the second side of the fourth capacitor;
        a seventh switch having a first side connected to the first side of the fourth capacitor and having a second side connected to the third voltage node; and
        an eighth switch having a first side connected to a first voltage node and having a second side directly connected to the first side of the fourth capacitor; and
    a second sub-circuit comprising:
        a second capacitor having a first side and a second side;
        a third capacitor having a first side and a second side;
        a first switch having a first side directly connected to the second side of the second capacitor and having a second side connected to the reference node;
        a second switch having a first side connected to the second voltage node and having a second side connected to the second side of the second capacitor;

a third switch having a first side connected to the first side of the second capacitor and having a second side connected to the second voltage node;

a fourth switch having a first side connected to the third voltage node and having a second side directly connected to the first side of the second capacitor;

a fifth switch having a first side directly connected to the second side of the third capacitor and having a second side connected to the reference node;

a sixth switch having a first side connected to the third voltage node and having a second side connected to the second side of the third capacitor;

a seventh switch having a first side connected to the first side of the third capacitor and having a second side connected to the third voltage node; and an eighth switch having a first side connected to a first voltage node and having a second side directly connected to the first side of the third capacitor.

2. The circuit of claim 1, wherein the reference node is connected to ground.

3. The circuit of claim 1, wherein, during a first configuration:
the first switch of the first sub-circuit is closed;
the second switch of the first sub-circuit is open;
the third switch of the first sub-circuit is closed;
the fourth switch of the first sub-circuit is open;
the fifth switch of the first sub-circuit is open;
the sixth switch of the first sub-circuit is closed;
the seventh switch of the first sub-circuit is open;
the eight switch of the first sub-circuit is closed;
the first switch of the second sub-circuit is open;
the second switch of the second sub-circuit is closed;
the third switch of the second sub-circuit is open;
the fourth switch of the second sub-circuit is closed;
the fifth switch of the second sub-circuit is closed;
the sixth switch of the second sub-circuit is open;
the seventh switch of the second sub-circuit is closed; and
the eighth switch of the second sub-circuit is open.

4. The circuit of claim 1, wherein, during a second configuration:
the first switch of the first sub-circuit is open;
the second switch of the first sub-circuit is closed;
the third switch of the first sub-circuit is open;
the fourth switch of the first sub-circuit is closed;
the fifth switch of the first sub-circuit is closed;
the sixth switch of the first sub-circuit is open;
the seventh switch of the first sub-circuit is closed;
the eighth switch of the first sub-circuit is open;
the first switch of the second sub-circuit is closed;
the second switch of the second sub-circuit is open;
the third switch of the second sub-circuit is closed;
the fourth switch of the second sub-circuit is open;
the fifth switch of the second sub-circuit is open;
the sixth switch of the second sub-circuit is closed;
the seventh switch of the second sub-circuit is open; and
the eighth switch of the second sub-circuit is closed.

5. The circuit of claim 1, wherein the first switch of the first sub-circuit, the second switch of the first sub-circuit, the third switch of the first sub-circuit, the fourth switch of the first sub-circuit, the fifth switch of the first sub-circuit, the sixth switch of the first sub-circuit, the seventh switch of the first sub-circuit, the eighth switch of the first sub-circuit, the first switch of the second sub-circuit, the second switch of the second sub-circuit, the third switch of the second sub-circuit, the fourth switch of the second sub-circuit, the fifth switch of the second sub-circuit, the sixth switch of the second sub-circuit, the seventh switch of the second sub-circuit, and the eighth switch of the second sub-circuit are formed from MOSFETs.

6. The circuit of claim 1, wherein the first voltage node receives an input voltage and the second voltage node outputs an output voltage.

7. The circuit of claim 1, wherein the second voltage node receives an input voltage and the first voltage node outputs an output voltage.

8. The circuit of claim 1, wherein the circuit is used to form a multi-phase voltage converter.

* * * * *